US012789940B2

(12) United States Patent
Delaval

(10) Patent No.: US 12,789,940 B2
(45) Date of Patent: Nov. 10, 2026

(54) SUSPENSION LOCKOUT SYSTEM FOR A VEHICLE

(71) Applicant: L'IDÉE MOTEUR, Chantonnay (FR)

(72) Inventor: Samuel Delaval, Chantonnay (FR)

(73) Assignee: L'IDÉE MOTEUR, Chantonnay (FR)

( * ) Notice: Subject to any disclaimer, the term of this patent is extended or adjusted under 35 U.S.C. 154(b) by 439 days.

(21) Appl. No.: 18/574,660

(22) PCT Filed: Jun. 10, 2022

(86) PCT No.: PCT/IB2022/055397

§ 371 (c)(1),
(2) Date: Dec. 27, 2023

(87) PCT Pub. No.: WO2023/275644

PCT Pub. Date: Jan. 5, 2023

(65) Prior Publication Data

US 2024/0383563 A1 Nov. 21, 2024

(30) Foreign Application Priority Data

Jun. 28, 2021 (FR) ...................................... 2106949

(51) Int. Cl.

| | |
|---|---|
| ***B62K 25/08*** | (2006.01) |
| ***F16F 9/56*** | (2006.01) |
| *B62K 25/04* | (2006.01) |

(52) U.S. Cl.

CPC ................ *B62K 25/08* (2013.01); *F16F 9/56* (2013.01); *B62K 2025/045* (2013.01); *B62K 2025/047* (2013.01)

(58) Field of Classification Search

CPC .. F16D 9/56; F16D 9/58; B62K 25/08; B62K 2025/045; B62K 2025/047

USPC .......................................................... 188/300

See application file for complete search history.

(56) References Cited

U.S. PATENT DOCUMENTS

| | | | | |
|---|---|---|---|---|
| 3,758,092 A | | 9/1973 | Mc, Gregor | |
| 4,078,779 A | * | 3/1978 | Molders | F16F 9/0254 188/300 |
| 4,404,445 A | * | 9/1983 | Baran | H01H 3/022 200/314 |

(Continued)

FOREIGN PATENT DOCUMENTS

WO 2020146321 A1 7/2020

OTHER PUBLICATIONS

International Search Report w/English translation for PCT/IB23022/055397, mailed Nov. 8, 2022, 5 pages.

(Continued)

*Primary Examiner* — Thomas J Williams

(74) *Attorney, Agent, or Firm* — NIXON & VANDERHYE

(57) ABSTRACT

A suspension lockout system suitable for use on a vehicle includes a telescopic fork suspension and at least one fork protector, including a first assembly having a catch hook, and a second assembly including a locking pin and a stationary support. The second assembly also includes a first elastic return assembly configured to be subjected to compression by the movement of the locking pin and a holding member which is translationally movable relative to the locking pin, since a second elastic return assembly of the holding member is provided, and in that the catch hook has a ramp.

11 Claims, 9 Drawing Sheets

(56) References Cited

U.S. PATENT DOCUMENTS

| | | | | |
|---|---|---|---|---|
| 7,559,565 | B2 * | 7/2009 | Nakamura | B62K 25/08<br>188/300 |
| 7,980,519 | B2 * | 7/2011 | Chen | A47B 9/14<br>248/161 |
| 8,752,810 | B2 * | 6/2014 | Anderson | F16F 9/56<br>188/300 |
| 2004/0055839 | A1 * | 3/2004 | Meret | B62K 25/08<br>188/300 |
| 2012/0292148 | A1 | 11/2012 | Phipps | |
| 2013/0187315 | A1 | 7/2013 | Kull et al. | |
| 2016/0144926 | A1 | 5/2016 | Devol | |
| 2017/0350468 | A1 * | 12/2017 | Groebner | B62K 25/06 |
| 2020/0216137 | A1 * | 7/2020 | Smith | B62K 25/08 |
| 2021/0214039 | A1 * | 7/2021 | Berger | B62K 25/08 |
| 2023/0150607 | A1 * | 5/2023 | Maret | B62K 25/08<br>280/276 |
| 2024/0383563 | A1 * | 11/2024 | Delaval | B62K 25/08 |

OTHER PUBLICATIONS

Written Opinion of the ISA w/English translation for PCT/IB23022/055397, mailed Nov. 8, 2022, 11 pages.

French Preliminary Search Report w/English translation for FR 2106949, dated Feb. 23, 2022, 2 pages.

French Written Opinion w/English translation for FR 2106949, dated Feb. 23, 2022, 10 pages.

* cited by examiner

SUSPENSION LOCKOUT SYSTEM FOR A VEHICLE

CROSS-REFERENCE TO RELATED APPLICATIONS

This application is the U.S. national phase of International Application No. PCT/IB2022/055397 filed Jun. 10, 2022, which designated the U.S. and claims priority to FR 2106949 filed Jun. 28, 2021, the entire contents of each of which are hereby incorporated by reference.

BACKGROUND OF THE INVENTION

Field of the Invention

The present invention relates to the field of suspension lockout systems, and more particularly to a suspension lockout system for vehicle intended to be used on a vehicle having a telescopic fork suspension and at least one fork protector, when starting off.

Description of the Related Art

In racing, particularly motorcycle racing, it is common practice to use suspension lockout devices to achieve a holeshot start. Such devices comprise a first assembly attached to the suspension and a second assembly attached to a fork protector. To lock the suspension, the pilot exerts a downward pressure on the suspension to bring the first assembly into a position lower than the second assembly. The second assembly is then operated so that a locking element protrudes and engages with the first assembly during the ascent of the suspension. Such devices are known from applications US2017/0,350,468 A1, US2016/0,144,926 A1 and US2012/0,292,148 A1. In these devices, the second assembly is operated by an operator other than the pilot. Therefore, they require two operators. In addition, their operation requires perfect synchronization between the two operators, since the second assembly must be operated before the ascent of the suspension, the descent/ascent movement of the suspension being particularly brief. These devices are therefore not easy to handle, and it is often necessary to repeat the operation. WO2020/146,321 A1 describes a starting device that can be operated by the pilot prior to pushing on the suspension. However, such a device is particularly complex, comprises parts that are difficult to machine and is of limited reliability.

On the other hand, all the devices in the prior art have the disadvantage of not being adjustable and, therefore, are only suitable for a single predefined suspension-to-protection distance, so that they do not work optimally, if at all, for different types of suspension/protection mounting.

There is therefore a need for a versatile suspension lockout device that is practical to use and reliable while having a simple design.

SUMMARY OF THE INVENTION

The Applicant therefore proposes to meet these needs by using a suspension lockout system for a vehicle comprising a telescopic suspension and a corresponding fork protector, that incorporates different types of return means, the ratio of stiffness constants of which will condition the prior locking of the second assembly.

The present invention therefore relates to a suspension lockout system intended to be used on a vehicle comprising a telescopic fork suspension and at least one fork protector, said fork having two pairs of telescopic tubes each comprising a lower tube connected to a wheel axle and an upper tube, the or each fork protector being mounted opposite a respective pair of telescopic tubes, the system comprising:

- a first assembly intended to be attached to an upper tube of the telescopic fork and comprising a catch hook, and
- a second assembly intended to be attached to said respective fork protector and comprising a lockout finger and a fixed support, whereby the second assembly is, in use, attached to the fork protector, the lockout finger being mounted for translational movement between a position, referred to as the lockout position, in which the lockout finger protrudes from the fixed support and, in use, passes through a hole provided for this purpose in said fork protector, and is captured by the catch hook to thereby lock the suspension, and a position, referred to as the retracted position, in which the lockout finger protrudes less than in the lockout position, so as not to interfere with the first assembly (2) and the suspension, wherein the first and second assemblies are further configured so that, in use, after a first descent of the upper tube, the first assembly is at a height lower than that of the second assembly, then the ascent of the upper tube is stopped by the lockout finger being caught in the catch hook, and following a second descent of the upper tube, the lockout finger is returned to the retracted position to no longer oppose the movements of the upper tube relative to the lower tube, the system being characterized in that the second assembly further comprises:

- a first return means configured to be urged in compression by the movement of the lockout finger from the retracted position to the lockout position,
- a holding member which is movable in translation relative to the lockout finger between a position, referred to as the holding position, in which it holds the lockout finger in an intermediate position, referred to as the stand-by position, in which the lockout finger protrudes further from the fixed support than in the retracted position, but less than in the lockout position, and a position, referred to as the release position, in which it does not oppose the return of the lockout finger to the retracted position under the action of the first return means, wherein a second elastic return means for returning the holding member to the release position is provided, the holding member being arranged such that, in the holding position, the lockout finger presses against the holding member under the action of the first return means, the first and second elastic return means being dimensioned such that, when the holding member is in the holding position, the return force of the first return means is greater than that of the second return means, whereby the holding member is held in the holding position by the first return means, and in that the catch hook has a ramp, referred to as the release ramp, against which, in use, the lockout finger comes into contact when the upper tube ascents following its first descent, the release ramp being directed so as to cause the lockout finger to move in translation from the stand-by position to the lockout position, releasing the pressure exerted by the lockout finger on the holding member and thus allowing the latter to return to the release position.

Thus, such a device has the advantage that it is automatic, as the holding member returns to the release position under the sole effect of the second return means.

Advantageously, the first assembly comprises a ring intended to be mounted around said upper tube, the catch hook being carried by the ring and intended, in use, to open upwards and face a first side of the respective fork protector, the second assembly is attached to a second side of the latter, opposite said first side, the fixed support comprising a base intended to be placed against the second side of said fork protector and a housing extending from the base, the base comprising a through hole opening into the housing, the lockout finger is mounted for translational movement in the housing along a longitudinal axis thereof, and comprises a shank portion which extends through the through hole of the base and a head portion having a cross-section that is larger than that of the shank portion and by means of which the lockout finger is guided in translation in the housing, the first elastic return means bears on the head portion of the lockout finger and on the base, the direction of action of the second return means lies in a plane perpendicular to the direction of action of the first return means, the holding member is mounted on the fixed support, and comprises first and second parts which are parallel to each other and perpendicular to the direction of action of the first return means, the holding member being arranged such that, in the holding position, the head portion of the lockout finger presses against said first part under the action of the first return means, the pressure exerted by the lockout finger being transmitted by the second part to a part, referred to as the opposition part, secured to the fixed support, and one of the catch hook and the free end of the shank portion of the lockout finger has a ramp, referred to as the passage ramp, directed such that, in use, with the lockout finger held in the stand-by position, during the first descent of the upper tube, the second assembly and the fork protector are moved as a whole away from the upper tube by the first assembly when the latter descends to a height lower than that of the second assembly.

According to a first particular embodiment, the holding member consists of a barrel mounted so as to be movable in rotation about and in translation along the longitudinal axis of the housing, the barrel having a first end which faces the head portion of the lockout finger and which constitutes said first part of the holding member, the barrel having a groove formed on the outer face of the barrel and having two closed ends, the groove comprising a first section which extends helically and defines a first closed end of the groove, closer to the base, and a second section which extends circumferentially from the end of the first section, and the opposition part, secured to the fixed support, is a pin one end of which is slidably received in the groove, said second part of the holding member being formed by the wall of the second section against which the pin comes into contact.

Advantageously, the groove further comprises a third section extending longitudinally from the end of the second section, towards the first end of the barrel.

Preferably, the second return means is formed by a torsion spring arranged at the first end of the barrel and whose coils are wound around the longitudinal axis of the housing, the torsion spring having a first end received in a hole provided in the barrel and by which the torsion spring is fixedly connected to the barrel and a second end received in a groove provided longitudinally in the inner face of the housing and by which the torsion spring is slidably connected to the housing.

Preferably, the suspension lockout system comprises an adjusting screw, connected to the barrel and intended to come into contact with the head portion of the lockout finger, the adjusting screw being configured to be operable so as to adjust the positioning of the lockout finger relative to the housing in the stand-by position.

Advantageously, a knob is attached to the second end of the barrel, outside the housing.

According to a second particular embodiment, the head portion of the lockout finger has a hole on its peripheral surface, the fixed support has a guide tube extending radially from the housing and opening into the latter, the guide tube being positioned so as to open onto said hole of the head portion when the lockout finger is in the stand-by position, and the holding member is formed by a shaft which is mounted for translation in the guide tube, a first end of the shaft being intended to be placed in said hole of the head portion when the holding member is in the holding position and a second end of the shaft being located outside the guide tube to be able to be operated by a user, said shaft forming said first and second parts of the holding member while the inner wall of the guide tube forms said opposition part secured to the fixed support.

Advantageously, said hole of the head portion is formed by a through hole, a blind hole or a peripheral groove.

Advantageously, a button is attached to the head portion of the lockout finger and is accessible from outside the housing, button by means of which a user is able to push the lockout finger from the retracted position to the stand-by position.

Preferably, the second return means is formed by a compression spring mounted around the shank portion of the lockout finger.

To better illustrate the subject matter of the present invention, several embodiments are described below, by way of illustration and without limitation, with reference to the appended drawings.

DESCRIPTION OF THE PREFERRED EMBODIMENTS

Figure 1:
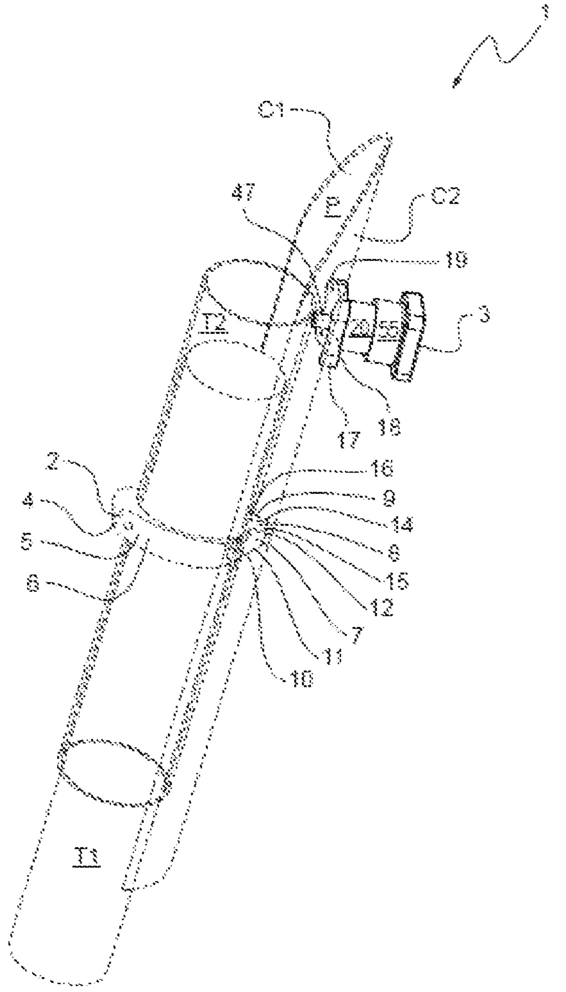
FIG. 1 is a perspective view of the suspension lockout system according to a first embodiment of the present invention, mounted on a vehicle comprising a telescopic suspension and a corresponding fork protector.

Referring to FIG. 1, a suspension lockout system 1 for a vehicle is shown. The system 1 is intended to be used on a vehicle comprising a telescopic fork suspension and at least one fork protector P, said fork having two pairs of telescopic tubes T1, T2 each comprising a lower tube T1 connected to a wheel axle (not shown) and an upper tube T2, the or each fork protector P being mounted opposite a respective pair of telescopic tubes T1, T2. The system 1 comprises a first assembly 2 and a second assembly 3. As shown in FIG. 1, the first assembly 2 is attached to the upper tube T2. The second assembly 3 is attached to the respective fork protector P. In particular, the suspension is that of a motorcycle and the fork protector P is arranged facing the suspension.

Figure 2:
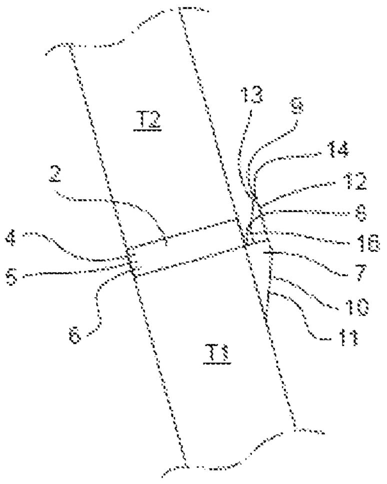
FIG. 2 is a side view of the first assembly of the lockout system according to FIG. 1.

FIGS. 1 and 2 show the first assembly 2 comprising a ring 4 mounted around the upper tube T2. The ring 4 consists of a ring clamp 5 comprising two arms 6 connected to a catch hook 7. It should be noted that any means suitable for securing the first assembly 2 to the suspension may be suitable, in particular any type of ring clamp.

The catch hook 7 is configured to engage with the second assembly 3 so as to lock the suspension. Locking the suspension is understood to mean locking the suspension at a certain level of travel, for example at a predetermined position of the tubes T1, T2 relative to each other, in one of the directions of movement of the upper tube T2 relative to the lower tube T1.

Once the first assembly 2 is mounted on the upper tube T2, the catch hook 7 is open upwards and faces a first side C1 of the fork protector P. The catch hook 7 comprises a receiving area 8 that has an open face 9. The catch hook 7 also comprises a first ramp 10, referred to as the passage ramp, the role of which will be explained below. According to the embodiment shown in FIG. 2, the passage ramp 10 has a lower part 11, at an angle to the upper tube T2, and an upper part 12, parallel to the upper tube T2. By lower and upper is meant the positioning at the bottom and top, respectively, of the first assembly 2 in the state mounted on the upper tube T2. It should be noted that the passage ramp of the catch hook may comprise a single section at an angle to the upper tube.

In addition, the catch hook 7 has a second ramp 13, referred to as the release ramp. The release ramp 13 extends from the upper edge 14 of the upper part 12, towards the receiving area 8. Advantageously, the lower part 11 of the passage ramp 10 and the release ramp 13 are parallel.

In FIG. 2, it can be seen that the passage ramp 10 and the release ramp 13 are straight.

Figure 3:
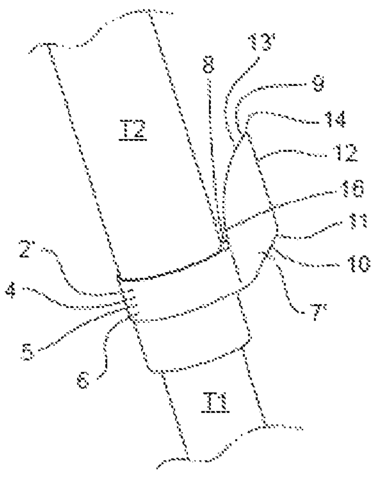
FIG. 3 is a side view of the first assembly of the lockout system according to a variant.

According to a variant shown in FIG. 3, the release ramp 13' of the catch hook 7' of the second assembly 2' is concave.

As shown in FIG. 1, the catch hook 7 comprises a slot 15 passing through the lower part 11 and the upper part 12.

Preferably, the receiving area 8 has a notch 16, on the upper tube T2-side, the role of which will be explained below.

Figure 4A:
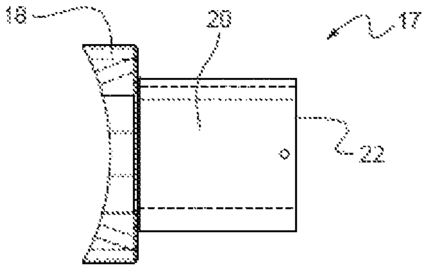
FIG. 4A is a top view of the fixed part of the second assembly of the lockout system of FIG. 1.
Figure 4B:
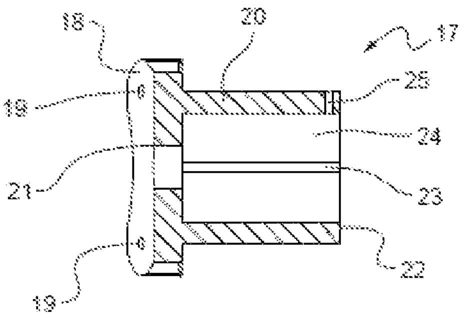
FIG. 4B is a longitudinal cross-section view of the fixed part of FIG. 4A.
Figure 4C:
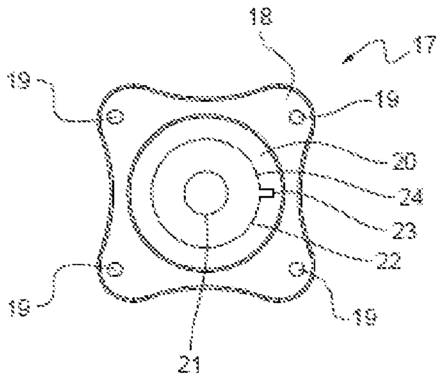
FIG. 4C is a front view of the fixed part of FIG. 4A.

The second assembly 3 comprises a fixed support 17, by means of which the second assembly 3 is, in use, attached to the fork protector P, on a second side C2 of the latter, opposite said first side C1. The fixed support 17 comprises a base 18 placed against the second side C2 of the fork protector P. Advantageously, as it can be seen in FIGS. 1 and 4A-4B, the base 18 has a curvature so as to conform to the curvature of the fork protector P. As shown in FIGS. 1 and 4B-4C, the base 18 has bores 19. The bores 19 are configured for attaching the base 18 to the fork protector P, for example by means of screws. The person skilled in the art will be able to envisage a suitable number of bores.

The fixed support 17 also comprises a hollow cylindrical housing 20 extending from the base 18. The base 18 has a through hole 21 opening into the housing 20 such that, at the base 18, the inside of the housing 20 communicates with the outside. The housing 20 is open on the side 22 opposite the base 18.

As it can be seen in FIG. 4B, a groove 23 is provided on the inner face 24 of the housing 20. This groove 23 extends longitudinally, preferably along the entire length of the housing 20.

The housing 20 comprises a through hole 25 close to the open side 22. The through hole 25 is arranged perpendicular to the axis of the groove 23 and is configured to receive a pin 26 as shown in FIGS. 7A-7D. The pin 26 is dimensioned so that, when inserted in the through hole 25, it has a free end 27 protruding inside the housing 20.

Figure 5A:
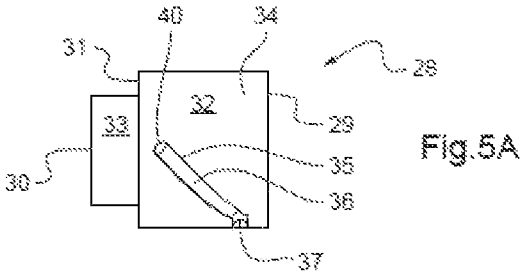
FIG. 5A is a side view of the barrel of the second assembly of FIG. 1.
Figure 5B:
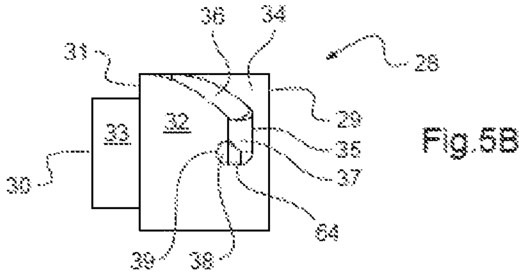
FIG. 5B is a side view of the barrel of FIG. 5A rotated at an angle of 90° around its longitudinal axis.
Figure 5C:
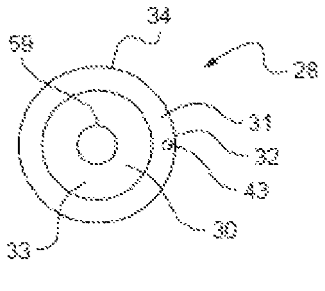
FIG. 5C is a rear view of the barrel of FIG. 5A.

The second assembly 3 also comprises a barrel 28. According to the first embodiment, the barrel 28 and the housing are dimensioned so that the barrel 28 can be received so as to slide translationally and rotationally inside the housing 20. As it can be seen in FIGS. 5A-5C, the barrel 28 is made cylindrical, having a first end 29 and a second end 30. In the state of the barrel 28 received in the housing 20, via the open side 22, the second end 30 faces the base 18. Preferably, as shown in FIGS. 5A-5B, the barrel 28 comprises a shoulder 31 so that it has, on the first end 29-side, a first cylinder 32 with an external diameter corresponding to the internal diameter of the housing 20 and, on the second end 30-side, a second cylinder 33 with a diameter smaller than that of the first cylinder 32.

On the outer face 34 of the first cylinder 32 of the barrel 28 runs a groove 35 configured to receive the free end 27 of the pin 26, as it can be seen in FIGS. 7A-7D. The groove has, from the second end 30 to the first end 29, a first section 36 extending helically and a second section 37 extending along a diameter of the first cylinder 32 of the barrel 28. According to the embodiment shown in FIG. 5B, the groove 35 also has a third section 38 extending longitudinally from the second section 37 towards the second end 30 of the barrel 28. Thus, the barrel 28 has a first end stop 39 at the third section 38 and a second end stop 40 at the first section 36, i.e. at each end of the groove 35.

Figure 6:
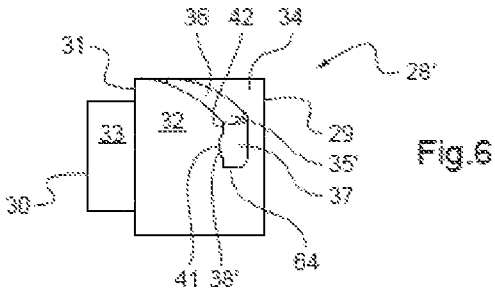
FIG. 6 is a side view of the barrel of FIG. 1 according to a variant.

Alternatively, as shown in FIG. 6, the third section 38' of the groove 35' is formed by a recess 41 provided on the face 42 of the second section 37, on the second end 30 side of the barrel 28'.

The barrel 28 comprises a hole 43. According to the embodiment shown in FIG. 5C, the hole 43 is provided on the shoulder 31, on the first cylinder 32. The role of the hole 43 will be explained below.

It should be noted that the barrel may consist of a single cylinder. In this case, the hole is provided in the face of the second end.

As shown in FIGS. 7A-7D, the second assembly 3 comprises a torsion spring 44. The torsion spring 44 has a first fixed end 45 configured to be received in the hole 43 of the barrel 28 and a second free end (not shown) configured to be received in the groove 23 of the housing 20. Thus, the torsion spring 44 is both fixedly connected to the barrel 28 via the first fixed end 45 and slidably connected to the housing 20 via the second free end. In the assembled state of the second assembly 3, it can be seen in FIGS. 7A-7D that the torsion spring 44 is wound around the second cylinder 33 and the coils 46 of the torsion spring 44 are arranged perpendicular to the longitudinal axis of the barrel 28. In the case of a single-cylinder barrel, the torsion spring is arranged against the face of the barrel facing the base.

Figure 7A:
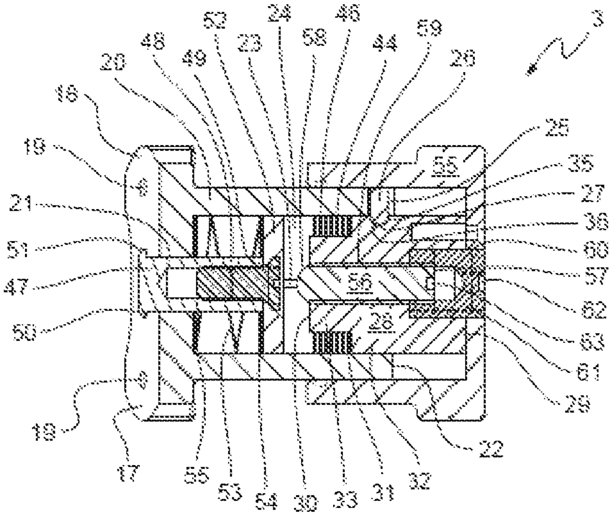
FIG. 7A is a longitudinal cross-section view of the second assembly of FIG. 1 at a first operating stage.
Figure 7B:
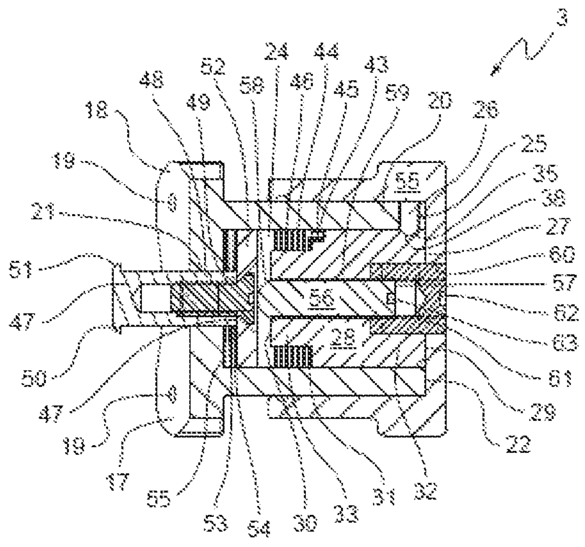
FIG. 7B is a longitudinal cross-section view of the second assembly of FIG. 1 at a second operating stage.
Figure 7C:
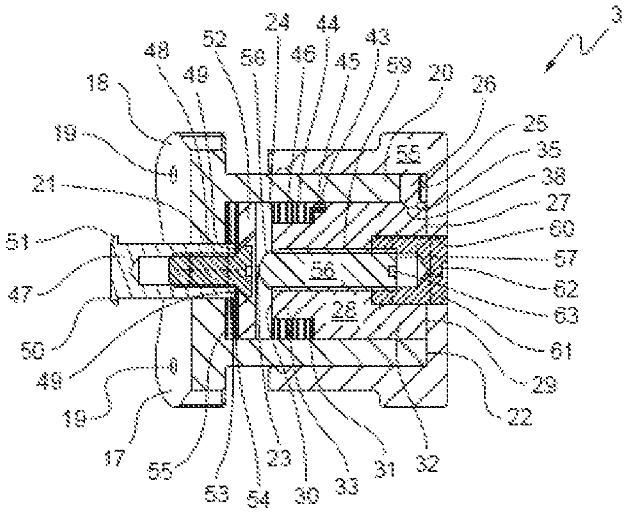
FIG. 7C is a longitudinal cross-section view of the second assembly of FIG. 1 at a third operating stage.
Figure 7D:
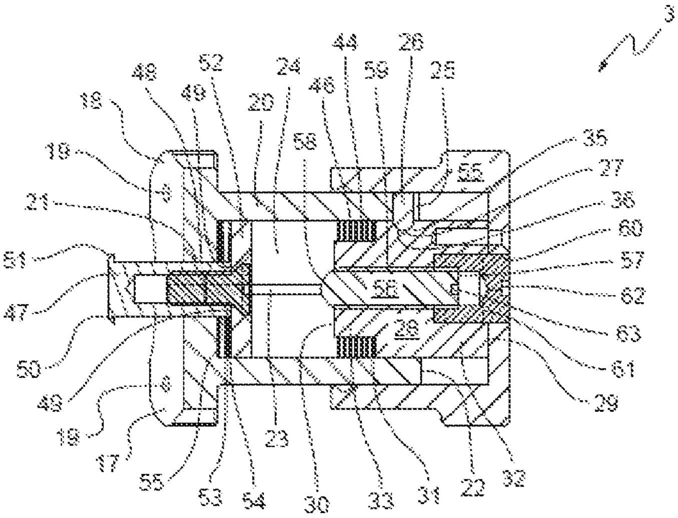
FIG. 7D is a longitudinal cross-section view of the second assembly of FIG. 1 at a fourth operating stage.

As shown in FIGS. 7A-7D, the second assembly 3 comprises a lockout finger 47. The lockout finger 47 is mounted for translational movement in the housing 20 along a longitudinal axis of the latter, between a position, referred to as the lockout position, in which the lockout finger 47 protrudes from the fixed support 17 as shown in FIG. 7D, and, in use, passes through the through hole 21 of the base 18 and a hole provided for this purpose in the fork protector P, and is caught by the catch hook 7 to lock the suspension, and a position referred to as the retracted position, in which the lockout finger 47 protrudes less than in the locked position, so as not to interfere with the first assembly 2 and the suspension, as shown in FIG. 7A.

The lockout finger 47 has a shank portion 48 with a first end 49 and a second end 50. Preferably, the shank portion 48 is cylindrical. The lockout finger 47 also has an extension 51 perpendicular to the shank portion 48, arranged at the second end 50. The shank portion 48 of the lockout finger 47 and the through hole 21 of the fixed support 17 have complementary shapes so that, in the assembled state of the second assembly 3, the lockout finger 47 is slidably received in the through hole 21, with the second end 50 outside the fixed support 17. In addition, the extension 51 is dimensioned such that it holds the second end 50 out of the fixed support 17. For example, as shown in FIGS. 7A-7D, the outer contour of the extension 51 is circular and has a diameter greater than the diameter of the through hole 21 of the base 18, thus forming a shoulder.

In the assembled state of the second assembly 3, the lockout finger 47 is parallel to the longitudinal axis of the barrel 28 and perpendicular to the base 18.

In addition, the shank portion 48 of the lockout finger 47 and the slot 13 of the first assembly 2 have complementary shapes so that the shank portion 48 can be received in the slot 13. Similarly, the extension 51 of the lockout finger 47 and the notch 16 of the first assembly 2 have complementary shapes so that the extension 51 can be received in the notch 16.

FIGS. 7A-7D show that the second assembly 3 comprises a spring plug 52. The spring plug 52 is connected to the first end 49 of the shank portion 48 of the lockout finger 47, perpendicular to the shank portion 48. The spring plug 52 has an external diameter substantially smaller than the internal diameter of the barrel 28. In addition, the spring plug 52 has a diameter greater than the diameter of the through hole 21 of the base 18, so as to hold the first end 49 of the shank portion 48 inside the housing 20.

The second assembly 3 also comprises a compression spring 53. The compression spring 53 is arranged in the housing 20, around the shank portion 48 of the lockout finger 47, between the spring plug 52 and the base 18, with a first end 54 configured to exert a pressure on the spring plug 52 and a second end 55 configured to exert a pressure on the base 18.

In FIGS. 1 and 7A-7D, it can be seen that the second assembly 3 comprises a knob 55. The knob 55 is connected to the first end 29 of the barrel 28. The knob 55 is configured to be operated by a user to drive the barrel 28 in rotation about its longitudinal axis. Preferably, the knob 55 is ergonomically shaped.

FIGS. 7A-7D show an adjusting screw 56. The adjusting screw 56 has a first end 57 and a second end 58. As it can be seen in FIGS. 5C and 7A-7D, the barrel 28 has a through hole 59 in which the adjusting screw 56 is adjustably received, with the second end 58 protruding into the housing 20. The adjusting screw 56 is intended to come into contact by its second end 58 with the spring plug 52, the adjusting screw 56 being configured to be operable so as to adjust the positioning of the lockout finger 47 relative to the housing 20. Thus, the through hole 59 of the barrel 28 and the adjusting screw 56 are provided with corresponding threads (not shown). The first end 57 is configured to operate the adjusting screw 56 and, for this purpose, has a screwdriver recess. Advantageously, the knob 55 has a corresponding hole 60, configured to receive a locknut 61 also received at the first end 29 of the barrel 28 and which screws onto the first end 57 of the adjusting screw 56 in order to lock the latter in position, once the adjustment has been made.

According to the first embodiment, the barrel 28 constitutes a holding member which is mounted on the fixed support 17 and is translationally movable relative to the lockout finger 47 between a position, referred to as the holding position, in which it holds the lockout finger 47 in an intermediate position, referred to as the stand-by position, in which the lockout finger 47 protrudes further from the fixed support 17 than in the retracted position, but less than in the lockout position, and a position, referred to as the release position, in which it does not oppose the return of the lockout finger 47 to the retracted position, under the action of the compression spring 53. The barrel 28 is shown in the release position in FIGS. 7A and 7D and in the holding position in FIG. 7B. The lockout finger 47 is shown in the retracted position in FIG. 7A, in the stand-by position in FIG. 7B and in the lockout position in FIG. 7D.

In the first embodiment, the spring plug 52 forms a head portion of the lockout finger 47, the cross-section of which is larger than that of the shank portion 48, and by means of which the lockout finger 47 is guided in translation in the housing 20.

Alternatively, the spring plug and lockout finger are made in one piece.

The compression spring 53 constitutes a first elastic return means and the torsion spring 44 constitutes a second elastic return means.

In the first embodiment, the second end 58 of the adjusting screw 56 constitutes a first part of the holding member. In the absence of an adjusting screw, the second end 30 of the barrel 28 which faces the head portion of the lockout finger 47 constitutes the first part of the holding member.

The wall of the groove against which the pin 26 comes into contact in the holding position constitutes a second part of the holding member. Thus, in FIG. 5B, the end stop 39 of the third section 38 constitutes the second part of the holding member. In the absence of a third section, the wall of the second section, on the second end-side of the barrel, constitutes the second part of the holding member.

The pin 26 forms an opposition part, secured to the fixed support 17.

Thus, the direction of action of the second return means is in a plane perpendicular to the direction of action of the first return means, the holding member comprises first and second parts which are parallel to each other and perpendicular to the direction of action of the first return means, the holding member being arranged such that, in the holding position, the head portion of the lockout finger 47 presses against said first part under the action of the first return means, the pressure exerted by the lockout finger 47 being transmitted by the second part to the opposition part, secured to the fixed support 17.

In addition, the first and second elastic return means are dimensioned such that, when the holding member is in the holding position, the return force of the first return means is greater than that of the second return means, whereby the holding member is held in the holding position by the first return means.

In the following, the operation of the lockout system 1 according to the first embodiment as shown in FIGS. 7A-7D will be described. In the initial state, as shown in FIG. 7A, the holding member, i.e. the barrel 28, is in the release position, the lockout finger 47 is in the retracted position, the second elastic return means, i.e. the torsion spring 44, and the first elastic return means, i.e. the compression spring 53, are in the unloaded state. The pin 26, i.e. the opposition part, is at the end of its travel at the second end stop 40 of the first section 36 of the groove 35. The user turns the knob 55, causing the barrel 28 to rotate. As a result of the free end 27 of the pin 26 sliding in the groove 35 and the helical arrangement of the first section 36 of the groove 35, the barrel 28 undergoes both a rotational and a translational movement relative to the housing 20 in the direction of the base 18. The torsion spring 44 undergoes torsion due to its first end 45 being driven in rotation by the barrel 28. The torsion spring 44 also undergoes translational movement due to its second end being slidably received in the groove 23 of the housing 20.

The second end 58 of the adjusting screw 56 comes into contact with the spring plug 52 and then pushes the latter towards the base 18, thus translating the lockout finger 47 and causing the second end 50 of the shank portion 48 to extend further, with the compression spring 53 being compressed. Once the free end 27 of the pin 26 has moved into the second section 37 of the groove 35, the barrel 28 undergoes only a rotational movement relative to the housing 20, further loading the torsion spring 44. The free end 27 of the pin 26 thus comes to abut against the end wall 64 of the second section 37, i.e. upstream of the third section 38 of the groove 35. This allows the user to release the knob 55, inducing the release of the compression spring 53, which then exerts pressure on the spring plug 52, transmitted to the adjusting screw 56 and thus to the barrel 28. This causes the barrel 28 to translate away from the base 18, with the free end 27 of the pin 26 being brought into the third section 38, as far as the first end stop 39. In this state, shown in FIG. 7B, the holding member is in the holding position and the lockout finger 47 is in the stand-by position.

The user can then exert a downward pressure on the vehicle fork, with the upper tube T2 sliding around the stationary lower tube T1. The first assembly 2, initially positioned at an height higher than the second assembly 3, is caused to move in front of the second assembly 3. The second end 50 of the lockout finger 47 slides along the passage ramp 10 of the catch hook 7. This pushes the fork protector P away from the suspension. Once the first assembly 2 has been brought to a height lower that of the second assembly 3, as shown in FIG. 1, the user can then release the pressure exerted on the fork, which has the effect of ascending the upper tube T2, i.e. ascending the first assembly 2 towards the second assembly 3. The second end 50 of the lockout finger 47 is then caused to slide on the release ramp 13 of the catch hook 7. This has the effect of pulling the lockout finger 47 further out of the housing 20 and thus further compressing the compression spring 53. According to the variant shown in FIG. 3, the fact that the release ramp 13' is concave has the effect of pulling the lockout finger even further. It should be noted that the person skilled in the art will be able to envisage shapes other than rectilinear and concave, as long as the release ramp performs the function of pulling the lockout finger out of the housing so as to compress the compression spring.

As a result, the lockout finger 47 moves away from the barrel 28 as shown in FIG. 7C. The absence of contact between the spring plug 52 and the second end 58 of the adjusting screw 56 (or the second end 30 according to the embodiment without adjusting screw) removes the force exerted by the compression spring 53, i.e. the first elastic return means, on the barrel 28, i.e. on the first part of the holding member. The barrel 28, thus released, is urged by the torsion spring 44, which rotates it, then rotates and translates it relative to the housing 20, as the free end 27 of the pin 26 moves in the groove 35, to return to the release position. Once the second end 50 of the lockout finger 47 has been received in the receiving area 8 and the extension 51 has been received in the notch 16, the lockout finger 47 is in the lockout position, as shown in FIG. 7D. The first assembly 2 and the second assembly 3 are thus connected and the suspension is locked.

The present invention is particularly advantageous compared with existing devices in that the catch hook 7 is dimensioned so that, when the lockout finger 47 is pulled, the catch hook 7 comes up against the fork protector P so as to prevent it from moving and thus approaching the upper tube T2. In this way, the combination of catch hook 7 and release ramp 13 enables the lockout finger 47 to be pulled as far as possible out of the housing 20, with the fork protector P held at a fixed distance from the upper tube T2, so as to compress the compression spring 53 as much as possible and thus release the torsion spring 44, i.e. the second elastic return means.

A new downward pressure exerted on the fork, e.g. as a result of the first braking action, causes the second end 50 to move away from the receiving area 8, i.e. the lockout finger 47 to move away from the catch hook 7, enabling the compression spring 53 to exert a return force on the spring plug 52, thus returning the lockout finger 47 to the retracted position, as shown in FIG. 7D.

FIGS. 8-11 show a second assembly 103 of the lockout system according to a second embodiment. The lockout system is similar to the lockout system 1 according to the first embodiment described above. The elements of the lockout system which are identical or similar to the elements of the lockout system of the first embodiment, and which are described with reference to FIGS. 8-11, will have the same reference numeral increased by 100, and will not be described in greater detail here.

According to the second embodiment, the holding member is formed by a shaft 65 which is mounted for translation in a guide tube 66. The guide tube 66 extends radially from the housing 120 and opens into the latter. At each end 67, 68, the shaft 65 has an extension 69, 70 which is perpendicular to the longitudinal direction of the shaft 65 and is designed to hold the shaft 65 in the guide tube 66.

The lockout finger 147 also comprises a cylinder 71 received inside the housing 120 and connected to the shank portion 148 of the lockout finger 147, at the first end 149. The cylinder 71 forms the head portion of the lockout finger 147 and has a diameter substantially smaller than the internal diameter of the housing 120, so that it can slide inside the housing 120. The head portion of the lockout finger 147 has a hole 72 on the peripheral surface of the cylinder 71. The guide tube 66 is positioned so as to open onto the hole 72 when the lockout finger 147 is in the stand-by position, one end 67 of the shaft 65 being intended to be placed in said hole 72 when the shaft 65 is in the holding position and the second end 68 of the shaft 65 being located outside the guide tube 66 so as to be operable by a user, as shown in FIG. 9.

It can be seen from FIGS. 8-11 that the second elastic return means consists of a compression spring 73 arranged around the guide tube between the extension 70 and the housing 120, and configured to bear against the extension 70 and the housing 120. It should be noted that the compression spring can be arranged inside the guide tube, around the shaft, between the extension and the housing.

The compression spring 153 constitutes the first elastic return means and is configured to bear against the base 118 and the cylinder 71.

Figure 8:
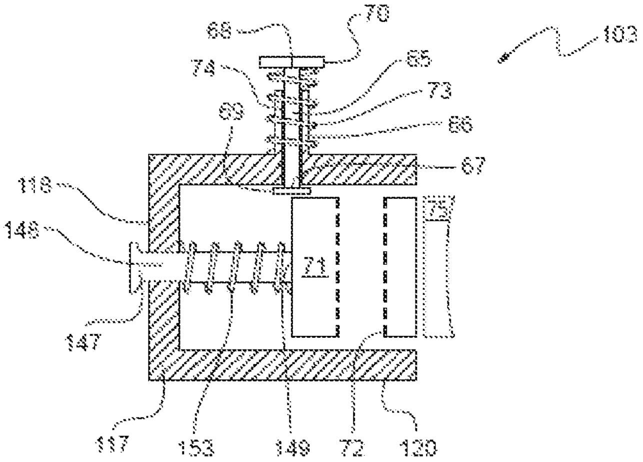
FIG. 8 is a longitudinal cross-section view of the second assembly according to a second embodiment at a first operating stage.
Figure 9:
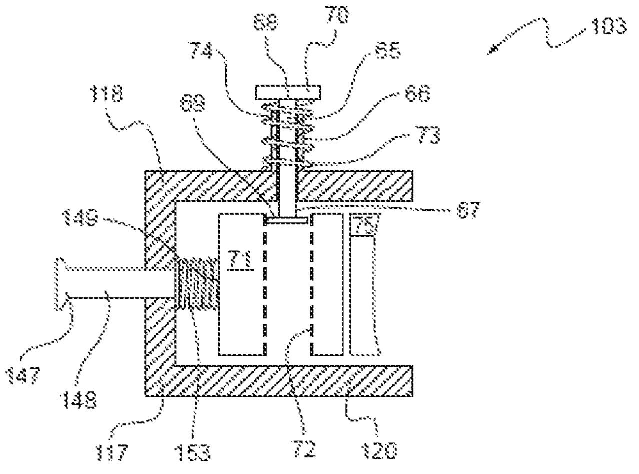
FIG. 9 is a longitudinal cross-section view of the second assembly according to the second embodiment at a second operating stage.

FIGS. 8-9 show that the compression spring 153 is cylindrical in shape. According to a variant shown in FIGS. 10-11, the compression spring 153' is truncated cone-shaped to further reduce the gap between the base 118 and the lockout finger 147 in the lockout position.

In the second embodiment, the shaft 65 forms said first and second parts of the holding member, while the inner wall 74 of the guide tube 66 forms the opposition part secured to the fixed support 117.

Figure 10:
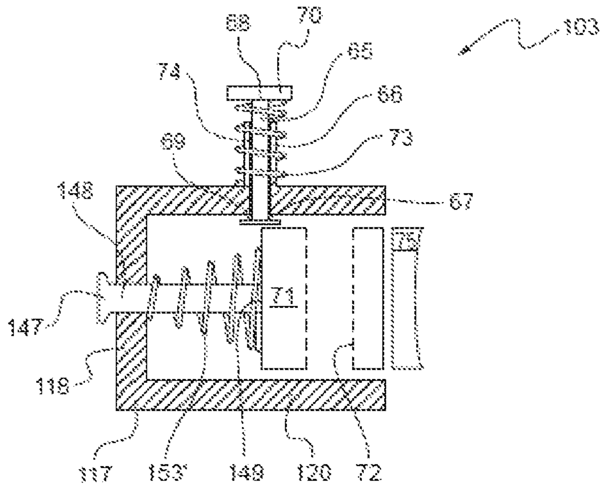
FIG. 10 is a longitudinal cross-section view of the second assembly according to a first variant of the second embodiment.

As shown in FIGS. 8-10, the hole 72 is preferably formed by a through hole. It should be noted that the hole in the head portion can also be a blind hole or a peripheral groove.

Advantageously, and as shown in FIGS. 8-11, a button 75 is attached to the cylinder 71 of the lockout finger 147 and is accessible from outside the housing 120, by which button 75 a user is able to push the lockout finger 147 from the retracted position to the stand-by position.

Figure 11:
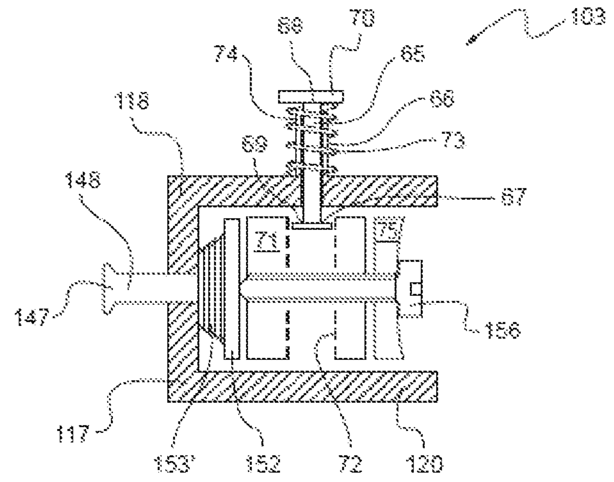
FIG. 11 is a longitudinal cross-section view of the second assembly according to a second variant of the second embodiment.

FIG. 11 shows a variant of the second embodiment in which the second assembly 103 has an adjusting screw 156 passing through the cylinder 71. The adjusting screw 156 is configured to operate in the same way as in the first embodiment. To this end, the second assembly 103 includes a spring plug 152 interposed between the shank portion 148 and the cylinder 71. The spring plug 152 and the cylinder 71 are not integral, such that the adjusting screw 156 is used to set the gap between them.

In the following, the operation of the lockout system according to the second embodiment as shown in FIGS. 8-9 will be described. In the initial state as shown in FIG. 8, the holding member, i.e. the shaft 65, is in the release position, with the end 67 outside the hole 72 of the cylinder 71. The lockout finger 147 is in the retracted position.

When the user exerts a pressure on the knob 75, transmitted to the cylinder 71, the lockout finger 147 is pushed further out of the housing 120, compressing the compression spring 153, until the end 67 of the shaft 65 faces the hole 72. There, the user, acting on the end 68 of the shaft 65, brings the other end 67 into the hole 72, compressing the compression spring 73, as shown in FIG. 9. As in the first embodiment, due to the configuration of the compression springs 153, 73, i.e. the first elastic return means and the second elastic return means, the shaft 65, i.e. the holding member, is held in the holding position. Under the effect of the second return means, the cylinder 71 exerts a pressure on the part of the shaft 65 that is received in the hole 72, i.e. the first part of the holding member, the pressure being transmitted to the part of the shaft 65, i.e. the second part of the holding member, thus pressed against the inner wall 74 of the guide tube 66, i.e. the opposition part. This is the stand-by position.

Once the lockout finger 147 has been caught by the catch hook, the pressure exerted by the first elastic return means on the cylinder 71 is removed so that, under the effect of the compression spring 73, the shaft 65 is returned to its release position. The return of the lockout finger 147 to its retracted position is similar to the first embodiment.

The invention claimed is:

1. A suspension lockout system intended to be used on a vehicle, the vehicle comprising a telescopic fork suspension and at least one fork protector, said telescopic fork suspension having a telescopic fork, said telescopic fork having two pairs of telescopic tubes, each pair of telescopic tubes comprising a lower tube connected to a wheel axle and an upper tube, the at least one fork protector being mounted opposite a respective pair of telescopic tubes, the suspension lockout system comprising:

a first assembly intended to be attached to an upper tube of the telescopic fork and comprising a catch hook, and — a second assembly intended to be attached to said respective fork protector and comprising a lockout finger and a fixed support with which the second assembly is, in use, attached to the fork protector, the lockout finger being mounted for translational movement between a lockout position, in which the lockout finger protrudes from the fixed support and, in use, passes through a hole provided for this purpose in said fork protector, and is caught by the catch hook to thereby lock the telescopic fork suspension, and a retracted position, in which the lockout finger protrudes less than in the lockout position, so as not to interfere with the first assembly and the telescopic fork suspension, wherein the first and second assemblies are further configured so that, in use, after a first descent of the upper tube, the first assembly is at a height lower than that of the second assembly, then the ascent of the upper tube is stopped by the lockout finger being caught in the catch hook, and following a second descent of the upper tube, the lockout finger is returned to the retracted position to no longer oppose movements of the upper tube relative to the lower tube, wherein the second assembly further comprises:

a first elastic return means configured to be urged into compression by a movement of the lockout finger from the retracted position to the lockout position, a holding member which is movable in translation relative to the lockout finger between a holding position, in which the holding member holds the lockout finger in an intermediate position, referred to as the stand-by position, in which the lockout finger protrudes further from the fixed support than in the retracted position, but less than in the lockout position, and a release position, in which the holding member does not oppose a return of the lockout finger to the retracted position under the action of the first elastic return means, wherein a second elastic return means for returning the holding member to the release position is provided, the holding member being arranged such that, in the holding position, the lockout finger presses against the holding member under the action of the first elastic return means, the first and second elastic return means being dimensioned such that, when the holding member is in the holding position, a return force of the first elastic return means is greater than that of the second elastic return means, whereby the holding member is held in the holding position by the first elastic return means, and wherein the catch hook has a release ramp against which, in use, the lockout finger comes into contact when the upper tube ascents following its first descent, the release ramp being directed so as to cause the lockout finger to move in translation from the stand-by position to the lockout position, releasing a pressure exerted by the lockout finger on the holding member and thus allowing the holding member to return to the release position.

2. The suspension lockout system according to claim 1, wherein:

the first assembly comprises a ring intended to be mounted around said upper tube, the catch hook being carried by the ring and intended, in use, to open upwards and face a first side of the respective fork protector, the second assembly is attached to a second side of the respective fork protector, opposite said first side, the fixed support comprising a base intended to be placed against the second side of said fork protector and a housing extending from the base, the base comprising a through hole opening into the housing, the lockout finger is mounted for translational movement in the housing along a longitudinal axis of the housing, and comprises a shank portion which extends through the through hole of the base and a head portion having a cross-section that is larger than that of the shank portion and by means of which the lockout finger guided in translation in the housing, the first elastic return means bears on the head portion of the lockout finger and on the base, a direction of action of the second elastic return means lies in a plane perpendicular to a direction of action of the first elastic return means, the holding member is mounted on the fixed support, and comprises first and second parts which are parallel to each other and perpendicular to the direction of action of the first elastic return means, the holding member being arranged such that, in the holding position, the head portion of the lockout finger presses against said first part under the action of the first elastic return means, a pressure exerted by the lockout finger being transmitted by the second part to an opposition part secured to the fixed support, and one of the catch hook and a free end of the shank portion of the lockout finger has a passage ramp directed such that, in use, with the lockout finger held in the stand-by position, during the first descent of the upper tube, the second assembly and the fork protector are moved as a whole away from the upper tube by the first assembly when the first assembly descends to a height lower than that of the second assembly.

3. The suspension lockout system according to claim 2, wherein the holding member consists of a barrel mounted so as to be movable in rotation about, and in translation along, the longitudinal axis of the housing, the barrel having a first end which faces the head portion of the lockout finger and which constitutes said first part of the holding member, the barrel having a groove formed on an outer face of the barrel and having two closed ends, the groove comprising a first section which extends helically and defines a first closed end of the groove, closer to the base, and a second section which extends circumferentially from an end of the first section, and the opposition part, secured to the fixed support, is a pin having one end that is slidably received in the groove, said second part of the holding member being formed by a wall of the second section against which the pin comes into contact.

4. The suspension lockout system according to claim 3, wherein the groove further comprises a third section extending longitudinally from an end of the second section, towards the first end of the barrel.

5. The suspension lockout system according to claim 3, wherein the second elastic return means is formed by a torsion spring arranged at the first end of the barrel and having coils that are wound around the longitudinal axis of the housing, the torsion spring having a first end received in a hole provided in the barreland by which the torsion spring is fixedly connected to the barrel and a second end received in a groove provided longitudinally in an inner face of the housing and by which the torsion spring is slidably connected to the housing.

6. The suspension lockout system according to claim 3, wherein the suspension lockout system comprises an adjusting screw, connected to the barrel and intended to come into contact with the head portion of the lockout finger, the adjusting screw being configured to be operable so as to adjust a positioning of the lockout finger relative to the housing in the stand-by position.

7. The suspension lockout system according to claim 3, wherein a knob is attached to the second end of the barrel, outside the housing.

8. The suspension lockout system according to claim 2, wherein the head portion of the lockout finger has a hole on the peripheral surface of the head portion, the fixed support has a guide tube extending radially from the housing and opening into the housing, the guide tube being positioned so as to open onto said hole of the head portion when the lockout finger is in the stand-by position, and the holding member is formed by a shaft which is mounted for translation in the guide tube, a first end of the shaft being intended to be placed in said hole of the head portion when the holding member is in the holding position and a second end of the shaft being located outside the guide tube to be able to be operated by a user, said shaft forming said first and second parts of the holding member while an inner wall of the guide tube forms said opposition part secured to the fixed support.

9. The suspension lockout system according to claim 8, wherein said hole of the head portion is formed by a through hole, a blind hole or a peripheral groove.

10. The suspension lockout system according to claim 8, wherein a button is attached to the head portion of the lockout finger and is accessible from outside the housing, by means of which the user is able to push the lockout finger from the retracted position to the stand-by position.

11. The suspension lockout system according to claim 2, wherein the second elastic return means is formed by a compression spring mounted around the shank portion of the lockout finger.

* * * * *